(12) United States Patent  
McAlister

(10) Patent No.: US 9,128,899 B1  
(45) Date of Patent: Sep. 8, 2015

(54) PREDICTIVE FAILOVER PLANNING

(75) Inventor: Jonathan P. McAlister, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 259 days.

(21) Appl. No.: 13/563,478

(22) Filed: Jul. 31, 2012

(51) Int. Cl.
- *G06F 11/00* (2006.01)
- *G06F 11/20* (2006.01)

(52) U.S. Cl.
CPC .......... *G06F 11/203* (2013.01); *G06F 11/2023* (2013.01)

(58) Field of Classification Search
CPC . G06F 11/202; G06F 11/2023; G06F 11/203; G06F 11/2046
USPC .......................................................... 714/13
See application file for complete search history.

(56) References Cited

U.S. PATENT DOCUMENTS

| | | | |
|---|---|---|---|
| 2001/0056554 A1* | 12/2001 | Chrabaszcz | 714/13 |
| 2003/0005350 A1* | 1/2003 | Koning et al. | 714/4 |
| 2006/0179147 A1* | 8/2006 | Tran et al. | 709/227 |
| 2011/0022882 A1* | 1/2011 | Jaehde et al. | 714/4 |
| 2012/0144233 A1* | 6/2012 | Griffith et al. | 714/13 |
| 2012/0297236 A1* | 11/2012 | Ziskind et al. | 714/3 |
| 2014/0040896 A1* | 2/2014 | Schmidt et al. | 718/1 |

* cited by examiner

*Primary Examiner* — Joshua Lohn  
(74) *Attorney, Agent, or Firm* — Birch, Stewart, Kolasch & Birch, LLP

(57) ABSTRACT

Variations discussed herein pertain to identifying a resource usage of applications in a first data center; and for the applications in the first data center, writing those usages to a database. Variations also pertain to identifying a resource usage of applications in a second data center; reading the first data center loads from the database; determining, from the read loads, which applications in the first data center will fail over to the second data center should the first data center fail. For those applications, computing a shadow load that represents predicted computing resource requirements of those applications in the second data center based read loads; and developing a failover resource allocation scheme from the shadow load and a current local resource load of the second data center such that the second data center can take on the resource usage load of those applications if the first data center goes offline.

17 Claims, 9 Drawing Sheets

FIG. 6a

| Instance ID | App ID | Processors | Memory | TimeStamp |
|---|---|---|---|---|
| 1 | AD998 | 1 | 2.5 | 1/1/11 11:1:1 |
| 2 | AD998 | 1.6 | 5 | 1/1/11 11:1:1 |
| 1 | F9F99 | 0.4 | 1.3 | 1/1/11 0:55:9 |
| 1 | AD998 | 2 | 6 | 1/1/11 0:55:9 |

Columns: 6010, 6020, 6030, 6040, 6050
Rows: 6060, 6070
6080

FIG. 6b

| Data Center | App ID | Instances | Processors | P. Memory | D. Memory | Row |
|---|---|---|---|---|---|---|
| A | 44E3E | 3 | 11 | 2 | 50 | 1 |
| A | AAD99 | 1 | 0.3 | 1.1 | 0.1 | 2 |
| A | 44E3E | 5 | 4 | 2.95 | 3.67 | 650 |

Columns: 6100, 6110, 6120, 6130, 6140, 6180, 6160
Rows: 6150, 6170

FIG. 6c

| Data Center | App ID | Failover DC | Instances | Processors | Memory |
|---|---|---|---|---|---|
| A | 55EF6 | B | 7 | 9 | 11 |
| A | 6E6E6 | C | 2 | 0.5 | 1.6 |
| B | 89A98 | A | 1 | 2 | 2.2 |

Columns: 6200, 6210, 6220
Rows: 6250, 6270

PREDICTIVE FAILOVER PLANNING

BACKGROUND

Before the advent of cloud computing as a commercial service, distributed computing was almost entirely restricted to use within government agencies and scientific and educational institutions. Such organizations had an expectation of some amount of system or application downtime and it was expected that certain applications or components could or would routinely fail or require reboot or re-start.

In a commercial environment, however, such software and system outages can cost thousands or, in some cases, millions of dollars in lost revenue. It is therefore preferable to have a plan of action in place for dealing with expected or possible system or software failures before such failures occur. However, in large-scale settings such as cloud computing environments, it is not readily feasible to individually manage each computing resource and application atomically.

SUMMARY

As resource allocations, hardware, and application makeup change within a cloud, a high availability and failover solution meant to ensure robustness and accessibility of cloud resource and applications should take these changes into account dynamically. In some cases, such a solution may have and maintain a continually evolving plan of action that can be implemented at any time to address the state of the system on an ongoing basis. Such a continually evolving/continually updated plan allows a state of the system at a time of failure to be known or approximated in advance of a failure event.

The techniques and solutions discussed herein relate, in part, to a method of monitoring the state of all systems and resources in a monitored cloud or monitored cloud portion and projecting a "shadow load" onto one or more data centers in the monitored portion. The "shadow load" represents one or more system, application, and resource loads from applications active (e.g. running and/or consuming computing resources) in other data centers. In some variations, this "shadow load" is only utilized for applications that are active in two or more data centers. This "shadow load" may be calculated, measured, monitored and/or updated on an ongoing basis based on the mix of active applications and available resources in the monitored portion.

In the event of application, system, resource, or hardware failure, the applications relying on the failed component/resource are re-allocated according to the shadow load. This allows for a highly robust and fault-tolerant system that can quickly and seamlessly re-allocate resources and move applications or application instances with minimal (and in some cases zero) disruption to service from the perspective of a system or application user.

Variations of the systems, methods, techniques, and devices discussed herein may pertain to a system comprising: a first processor in a first data center; and a first processor-readable memory having stored thereon instructions which, when executed, cause the first processor to perform the steps of: first identifying a resource usage load of one or more applications active in the first data center; and for the one or more applications active in the first data center, storing a result of the first identifying in a database with a first application manager operating in the first data center.

Some variations may also include a second processor in a second data center; and a second processor-readable memory having stored thereon instructions which, when executed, cause the second processor to perform the steps of: second identifying a resource usage load of one or more applications active in the second data center; reading a result of the first identifying from the database with a second application manager operating in the second data center; determining, based on the read result, a group of one or more applications in the first data center indicated to fail over to the second data center should the first data center fail; for the determined group of applications, computing a shadow resource load with the second application manager, the shadow resource load representing predicted computing resource requirements of the determined group of applications in the second data center based on the stored result of the first identifying for each application in the determined group; and developing a failover resource allocation scheme based on the computed shadow resource load and a current local resource load of the second data center such that the second data center can automatically take on the resource usage load of the determined group of applications if the first data center becomes unavailable In some variations, the first identified resource usage load includes total CPU usage and total memory usage of each of the one or more applications active in the first data center. In some variations, the step of first identifying includes: gathering resource usage information from application servers in the first data center, where an application server provides resource usage information for an application running on that application server; and aggregating the gathered resource usage information for each of the one or more applications that is running on more than one application server in the data center.

In some variations, the step of storing a result includes writing the aggregated resource usage information to the database. In some variations, the system further comprises a second database that receives a replicated version of the stored result from the database to. In some variations, the step of reading a result includes reading the replicated stored result from the second database.

In some variations, the step of developing a failover resource allocation scheme includes: for each application in the determined group of applications, comparing a number of instances of an application in the current local resource load and a number of instances of that application in the shadow resource load; and setting, as a required number of application instances in the event of failover, a largest of the compared numbers.

In some variations, the step of second identifying includes: gathering resource usage information from application servers in the second data center, where an application server provides resource usage information for all application instances running on that application server; and aggregating the gathered resource usage information for each application that is active in the data center by combining the gathered resource usage information about each instance of an application.

Variations of the systems, methods, techniques, and devices discussed herein may pertain to a system comprising: a processor in a data center; and a processor-readable memory having stored thereon instructions which, when executed, cause the processor to perform the steps of: identifying a local resource usage load of one or more applications active on application servers in the data center; reading remote data center resource usage loads from a database, where the remote data center resource usage data includes resource usage loads of one or more applications active on application servers in remote data centers; determining, from the read remote resource usage loads, a group of resource usage loads associated with a group of one or more applications configured to fail over to the data center in the event a remote data center where one or more of those applications are currently running fails; calculating a shadow load based on a result of the determining, where the shadow load represents an expected local resource usage load for the group of one or more applications based on the read remote resource usage loads; and developing a failover resource allocation scheme based on the shadow load and the local resource usage load, where the failover resource allocation scheme includes a resource allocation plan to be implemented in the event resource usage loads from the group of one or more applications are redirected to the data center.

In some variations, the step of developing a failover resource allocation scheme includes: determining an expected percentage of CPU usage by adding an overall level of CPU usage from the local resource usage load and an overall level of CPU usage from the shadow load and dividing the added CPU usage by a total available CPU amount in the data center; determining an expected percentage of memory usage by adding an overall level of memory usage from the local resource usage load and an overall level of CPU usage from the shadow load and dividing the added memory usage by a total available memory amount in the data center; and using, as an expected overall usage level of data center resources, a larger of the determined percentage of CPU usage and the determined percentage of memory usage; where a level of CPU usage is measured in discrete, predetermined units of data processing capacity.

In some variations, the processor-readable memory has instructions stored thereon which, when executed, cause the processor to perform the step of writing a result of the identifying to a database and/or of otherwise causing a result of the identifying to be stored in a database.

In some variations, the step of identifying includes: gathering resource usage information from application servers in the data center, where an application server provides resource usage information for an application running on that application server; and aggregating the gathered resource usage information for each of the one or more applications that is running on more than one application server in the data center; and where the step of storing includes storing the aggregated information.

In some variations, step of developing a failover resource allocation scheme includes: for each application in the determined group of applications, comparing a number of instances of an application in the current local resource load and a number of instances of that application in the shadow resource load; and setting, as a required number of application instances in the event of failover, a largest of the compared numbers.

Variations of the systems, methods, techniques, and devices discussed herein may pertain to a method of developing a failover resource allocation scheme, the method comprising the steps of: identifying a local resource usage load of one or more applications active on application servers in the data center; reading remote data center resource usage loads from a database, where the remote data center resource usage data includes resource usage loads of one or more applications active on application servers in remote data centers; determining, from the read remote resource usage loads, a group of resource usage loads associated with a group of one or more applications configured to fail over to the data center in the event a remote data center where one or more of those applications are currently running fails; calculating a shadow load based on a result of the determining, where the shadow load represents an expected local resource usage load for the group of one or more applications based on the read remote resource usage loads; and developing a failover resource allocation scheme based on the shadow load and the local resource usage load, where the failover resource allocation scheme includes a resource allocation plan to be implemented in the event resource usage loads from the group of one or more applications are redirected to the data center.

In some variations, the method further includes the step of storing a result of the identifying in a database. In some variations, the step of storing may include or otherwise be related to a step of writing a result of the identifying to the database.

In some variations, the step of developing a failover resource allocation scheme may include determining an expected percentage of CPU usage by adding an overall level of CPU usage from the local resource usage load and an overall level of CPU usage from the shadow load and dividing the added CPU usage by a total available CPU amount in the data center; determining an expected percentage of memory usage by adding an overall level of memory usage from the local resource usage load and an overall level of CPU usage from the shadow load and dividing the added memory usage by a total available memory amount in the data center; and using, as an expected overall usage level of data center resources, a larger of the determined percentage of CPU usage and the determined percentage of memory usage; where a level of CPU usage is measured in discrete, predetermined units of data processing capacity.

In some variations, the step of identifying may include: gathering resource usage information from application servers in the data center, where an application server provides resource usage information for an application running on that application server; and aggregating the gathered resource usage information for each of the one or more applications that is running on more than one application server in the data center; and where the step of storing includes storing the aggregated information.

In some variations, the step of developing a failover resource allocation scheme may include: for each application in the determined group of applications, comparing a number of instances of an application in the current local resource load and a number of instances of that application in the shadow resource load; and setting, as a required number of application instances in the event of failover, a largest of the compared numbers.

Variations of the systems, methods, techniques, and devices discussed herein may pertain to a non-transitory computer-readable medium having embodied thereon instructions which, when executed by one or more computers or data processors, cause the computer(s) or data processor(s) to execute some or all of the methods and variations thereof discussed above. Further variations may fully or partially embody such methods and systems and variations thereof in one or more specialized hardware components such as purpose-specific computers or data processors or database systems.

Further scope of applicability of the systems and methods discussed herein will become apparent from the detailed description given hereinafter. However, it should be understood that the detailed description and specific examples, while indicating preferred embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings which are given by way of illustration only, and thus are not limitative, and wherein

FIGS. 6a-6c depict variations of data records used to record and convey application load information.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

Variations of techniques, devices, programs, and solutions discussed herein relate to managing resources within a Data Center And managing applications and application instances within and across data centers. Some variations relate to planning for failover of applications or application instances from one data center to another data center, and the attendant allocation and re-allocation of resources associated with such failover. This document therefore begins with a brief overview of a Data Center and its constituents before discussing the application monitoring and failover aspects of the techniques and systems disclosed herein.

Figure 1:
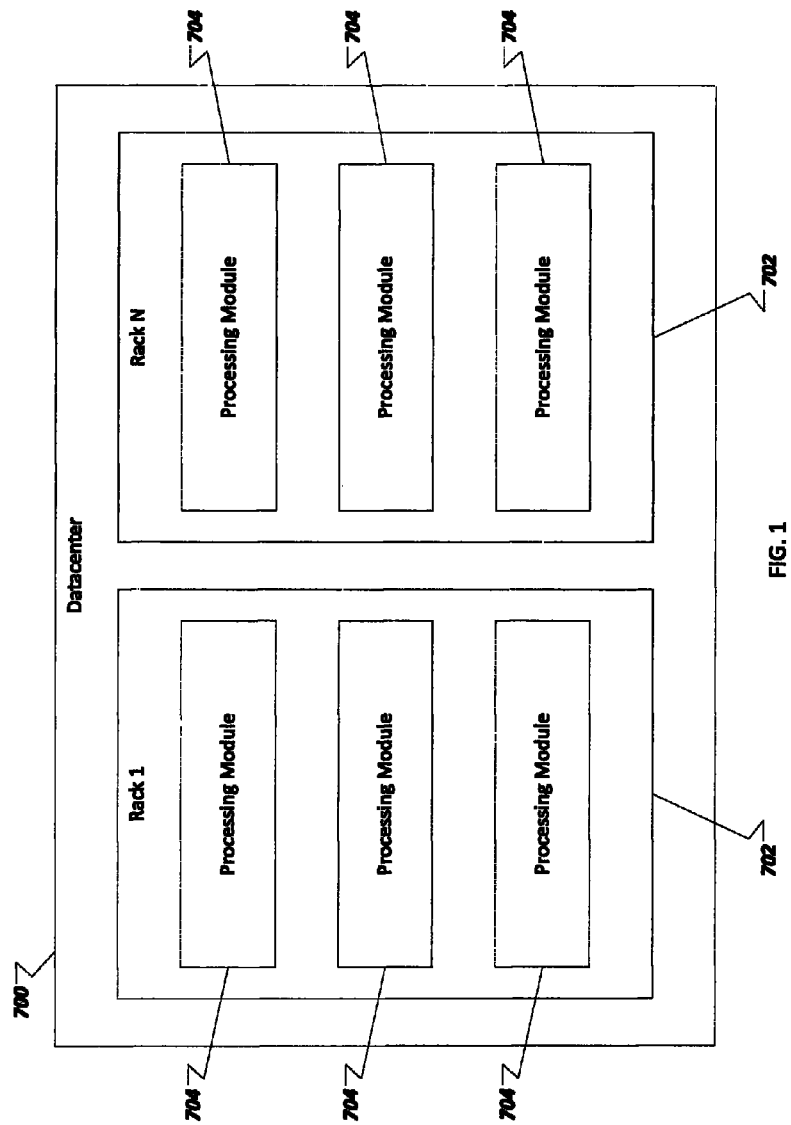
FIG. 1 depicts a variation of a data center having multiple processing modules.

FIG. 1 is a block diagram illustrating an example of a datacenter (700). The data center (700) is used to store data, perform computational tasks, and transmit data to other systems outside of the datacenter using, for example, a network connected to the datacenter. In particular, the datacenter (700) may perform large-scale data processing on massive amounts of data.

The datacenter (700) includes multiple racks (702). While only two racks are shown, the datacenter (700) may have many more racks. Each rack (702) can include a frame or cabinet into which components, such as processing modules (704), are mounted. In general, each processing module (704) can include a circuit board, such as a motherboard, on which a variety of computer-related components are mounted to perform data processing. The processing modules (704) within each rack (702) are interconnected to one another through, for example, a rack switch, and the racks (702) within each datacenter (700) are also interconnected through, for example, a datacenter switch.

A rack can include storage, like one or more network attached disks, that is shared by the one or more processing modules (704) and/or each processing module (704) may include its own storage. Additionally, or alternatively, there may be remote storage connected to the racks through a network. The processing module (704) may be a computing device such as a rack computer, a server, or any other suitable form of computing device. This is discussed further with respect to FIG. 7.

The datacenter (700) may include dedicated optical links or other dedicated communication channels, as well as supporting hardware, such as modems, bridges, routers, switches, wireless antennas and towers. The datacenter (700) may include one or more wide area networks (WANs) as well as multiple local area networks (LANs).

A processing module (704) may represent an application server that hosts one or more applications. An application server may have multiple applications running simultaneously thereon, and may have multiple copies or "instances" of an application running.

When a data center (700) or processing modules (704) within a data center fail, the applications that are active/running on that data center (700) and/or those processing modules (704) may become unavailable. In highly distributed computing environments, such as cloud computing systems or other online or web-based application services or service providers, this may cause significant disruption to users and/or other applications or entities utilizing the applications at the time of failure. Although failure recovery and redundancy solutions are available, such solutions have several disadvantages, including latency, a need for dedicated resources, and limitations with respect to the type and mix of applications and application types that can be operating and/or managed for failure recovery within and across data centers and processing modules.

Figure 2A:
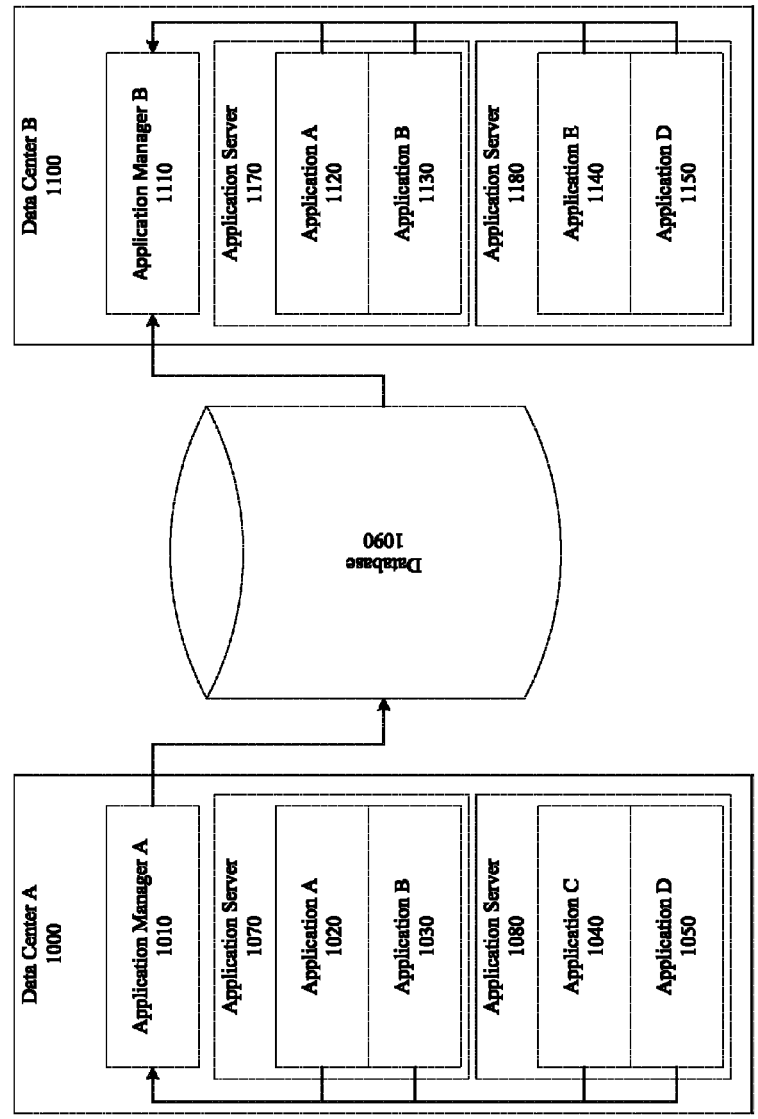
FIG. 2a depicts a variation of data centers sharing load information.

Especially in a cloud computing environment, settings where computing infrastructure and/or virtual machines are offered as a service do not allow for ready control of the particular applications or mix of applications, making application failover and failover planning particularly challenging. In one variation, application failover may be realized on a per-application basis by identifying two or more data centers running (or capable of running) the same application. A front end of such an application may only be sending traffic to one of the data centers. In such variations, user load from the application in the one data center could, in the event of data center or application failure, be shifted over to the same application in the other data center. A system configured for such a variation is shown in FIG. 2a.

In the variation shown, Data Center A 1000 may have multiple applications 1020, 1030, 1040, 1050 running in application servers 1070, 1080 within the data center 1000. The data center 1000 may also have an Application Manager 1010, which may itself be a separate server or may be part of an underlying set of system features or utilities enabling operation of the data center 1000. The Application Manager 1010 identifies all the applications 1020, 1030, 1040, 1050 and application servers 1070, 1080 active in the data center 1000 and writes information about the applications and their levels of system resource usage within the data center 1000 to a database 1090. System resource usage may be represented by an amount of processing power and memory being consumed by one or more of the applications within an application server. In some variations, the Application Manager 1010 may interrogate each application server to determine a load for each applications in the application server and/or to an overall load for the application server. In some variations, the applications themselves may not be polled directly because they may not be trusted to report accurate load information. In some variations, load information may include CPU and memory usage. In further variations, load information may also include metrics such as QPS (Queries Per Second), which represents the number of queries an application and/or an application server is handling per second.

Data Center B 1100 may also have multiple applications 1120, 1130, 1140, 1150 running in application servers 1180, 1170 located in the data center. This data center 1100 may also have an application manager 1110 similar to the application manager 1010 in Data Center A 1000. The application manager 1110 in Data Center B 1100 may read the system resource usage information about Data Center A 1000 from the database 1090 and compare the read information to measured and monitored information about the applications 1120, 1130, 1140, 1150 in the data center 1100 and their levels of system resource usage.

In some variations, an application server in a data center may correspond to one or more physical and/or logical processing modules (704). In some variations, a logical application server may grow or shrink to occupy multiple and/or partial portions of a physical processing module (704). In such variations, some or all of the processing modules (704) in a data center may be standardized or otherwise have known physical arrangements whereas a logical application server created from one or more processing modules and/or from fragments/portions of a processing module may emulate hardware properties that are not otherwise physically present in the data center.

In some variations, a processing module may include a physical or logical data processor. A physical data processor may include data processing chips such as, for example, a chip having an x86 architecture or a chip having an ARM (Advanced RISC Machine) architecture. A logical data processor may include an emulator or other logical data processing entity simulating behavior of a computer processor that may or may not otherwise be present or available in the data center.

In the variation shown in FIG. 2a, Application C 1040 from Data Center A 1000 is not active in Data Center B 1100. Similarly, Application E 1140 from Data Center B 1100 is not active in Data Center A 1000. In some variations, an application that is not active in a data center may represent an application that is not currently running in the data center or one that is not currently consuming any system resources (e.g. CPU, memory) of the data center. In some variations, in the event Data Center A 1000 fails, or one of the application servers 1070, 1080 in Data Center A 1000 fail, the affected application(s) may have their load/usage moved or re-directed to a back-up or secondary data center, such as Data Center B 1100. In some variations, each application may be identified or identifiable by a globally unique identifier assigned when the application is created.

In some variations, those applications which are active in both Data Center A 1000 and Data Center B 1100 may have their user loads transferred, or be otherwise redirected to Data Center B 1100. In such variations, the re-direction process is a process of load transfer and resource re-allocation that may not involve starting new applications or new application instances on the destination data center. In such variations, computing load, usage, and data processing may be re-directed by an application front end from failed Application A 1020 to still-active Application A 1120 with little or no interruption in operation and little or no loss of data.

In other variations, an application that is active in Data Center A 1000 but not active in Data Center B 1100 may nonetheless be transferred to Data Center B 1100 so long as the Application Manager 1110 in the data center has access to the application's data store and metadata about the application required to start or otherwise activate one or more instances of the application on one or more application servers in the data center. In such variations, the application is preferably state-less and the application data store is preferably either not in the failed data center or otherwise replicated to make the data store accessible even in the event of data center failure.

In the variation shown, Application Manager B 1110 may read or otherwise evaluate written application and resource usage information written by Application Manager A 1100 about the applications and application servers of Data Center A 1000. Application Manager B 1110 may also look for application and resource usage information about Application E 1140 in the database 1090 because Application E 1140 is active in the data center 1100. Additionally, Application Manager may look for application and resource usage information about applications not active in Data Center B 1100 but which have Data Center B 1100 set or otherwise indicated as a back-up data center. Such indication may be written to and read from the database 1090. Application Manager B 1110 may, however, overlook or otherwise ignore information about applications that do not indicate or otherwise have Data Center B 1100 set as their secondary or back-up data center.

In some variations, an application manager may determine which applications are active in the data center by consulting an application distribution map. In some variations, this map may be called a "shard map" and may list data centers that can serve a particular application ID. Variations of such a shard map may be stored in a database, a network file system, or in one or more specialized data servers. Preferably, such a shard map is highly available and globally consistent. In some variations, the shard map may be used to inform an application manager which applications or application IDs have designated the data center running the application manager as a back-up or secondary data center. In such variations, the shard map may produce ordered lists of data centers for each application ID, with the list order indicating a data center preference.

Information about the active applications in a data center may be gathered by the application manager by polling the application servers of the data center. In some variations, the application manager 1110 may have a list of all application servers 1170, 1180 in the data center 1100 and then query each application server to determine its application makeup and load level(s). In other variations, each application server in the data center 1100 may be configured to periodically contact the application manager 1110 and report its load. Such load reporting may include memory, CPU, and/or QPS or similar data for the overall application server as well as on a per-application basis. Such load reporting may also include the global identifiers of the applications active on the application server. Such information may be collected and, in some cases, aggregated by the application manager 1110, which then writes that information to the database 1090.

Although depicted as separate entities, Data Center A 1300 and Data Center B 1500 may also be logically distinct portions of a computing environment. In some variations, one physical or geographic location may include two or more logically distinct data centers which may participate in such a load reporting and load information exchange scheme as discussed herein. In further variations, a data center may represent a group of application servers in a computing environment. In such variations, data centers may be dynamically or otherwise fluidly defined and re-defined in a computing environment depending on particular usage requirements, administrator preferences, or other factors.

In some variations, such a resource usage reporting system may be configured to work with yet other application managers in other data centers, which may be looking for information related to those applications active within those data centers. Such a variation is shown in FIG. 2b.

Figure 2B:
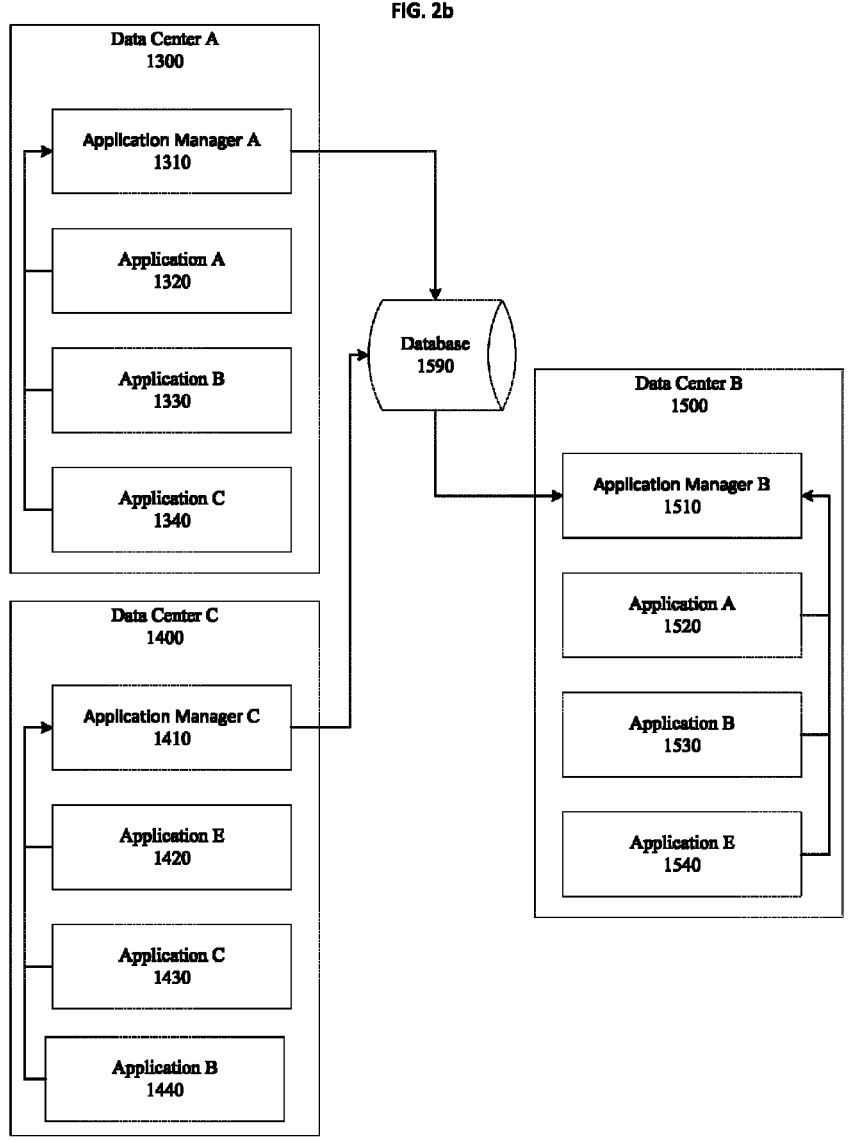
FIG. 2b depicts a variation of data centers sharing load information.

In the variation shown in FIG. 2b, Data Center A 1300 may have multiple applications 1320, 1330, 1340 active thereon. Data Center A 1300 may also have an Application Manager 1310 which may itself be an application or may be part of an underlying set of system features or utilities enabling operation of the data center 1300. The Application Manager 1310 identifies all the applications 1320, 1330, 1340 active in the data center 1300 and writes information about the applications and their levels of system resource usage within the data center 1300 to a database 1590.

Data Center B 1500 may also have multiple applications 1520, 1530, 1540 running thereon. This data center 1500 may also have an application manager 1510 similar to the application manager 1310 in Data Center A 1300. The application manager 1510 in Data Center B 1500 may read the written application information from the database 1090 and compare the read information to measured and monitored information about the applications 1520, 1530, 1540 in the data center 1500 and their levels of system resource usage. Also, Application Manager B 1510 identifies all the applications 1520, 1530, 1540 active in the data center 1500 and writes information about the applications and their levels of system resource usage within the data center 1500 to a database 1590.

Data Center C 1400 may also have multiple applications 1420, 1430, 1440 running thereon. This data center 1400 may also have an application manager 1410 similar to the application manager s 1310, 1510 in Data Centers A 1300 and B 1500. The application manager 1410 in Data Center C 1400 may read the written application information from the database 1090 and compare the read information to measured and monitored information about the applications 1420, 1430, 1440 in the data center 1400 and their levels of system resource usage. Also, Application Manager C 1410 identifies all the applications 1420, 1430, 1440 active in the data center 1400 and writes information about the applications and their levels of system resource usage within the data center 1400 to a database 1590.

In the variation shown, Application C 1340 in Data Center A 1300 may indicate Data Center B 1500 as a preferred back-up or secondary data center. Preferably Application C 1340 is state-less. More preferably, Application C 1340 uses a global or globally accessible/replicated database for storing all state/processing information. In such variations, a front end for Application C 1340 simply needs to re-direct traffic to Data Center B 1500 in the event Data Center A 1300 fails.

If, however, Application C 1340 ceased to be active in Data Center A 1300, Application Manager A 1310 will stop collecting information about Application C 1340. In some variations, this is a natural consequence of Application C 1340 becoming inactive in Data Center A 1300. Since the application is inactive, the application server(s) (not shown) no longer report usage and load information for the application and therefore Application Manager A 1310 no longer conveys that information to the database 1590.

Similarly, if Application E (not shown) became active in Data Center A 1300, Application Manager A 1310 would now look for information about Application E in the database 1590 (and also write information about Application E to the database 1590). Application E 1420 from Data Center C 1400 could now have its load moved to the version of Application E (not shown) now active in Data Center A 1300 if Application E 1420 from Data Center C 1400 indicates Data Center A 1300 as a preferred secondary data center. In some variations, such data center preference information may be stored in the shard map. In further variations, the shard map may be organized on a per-application basis such that a first group of applications (Applications A, B, C, for example) may be associated with a first data center preference sequence, such as Data Center A, then B, and C, whereas a second group of applications (Applications D, E, F, and G, for example) may be associated with a second data center preference sequence (Data Center C, then A, then B, for example). Further variations and embodiments may employ other database preference setting schemes depending on the applications in and organizational scheme of the shard map.

Although in the variation shown in FIG. 2b, the database is depicted as a central or otherwise centralized database 1590 shared or commonly accessed by the data centers 1300, 1400, 1500, other variations may include a database in each data center, with the database contents being replicated or otherwise provided or shared between the data centers. Such a variation is shown in FIG. 2c.

Figure 2C:
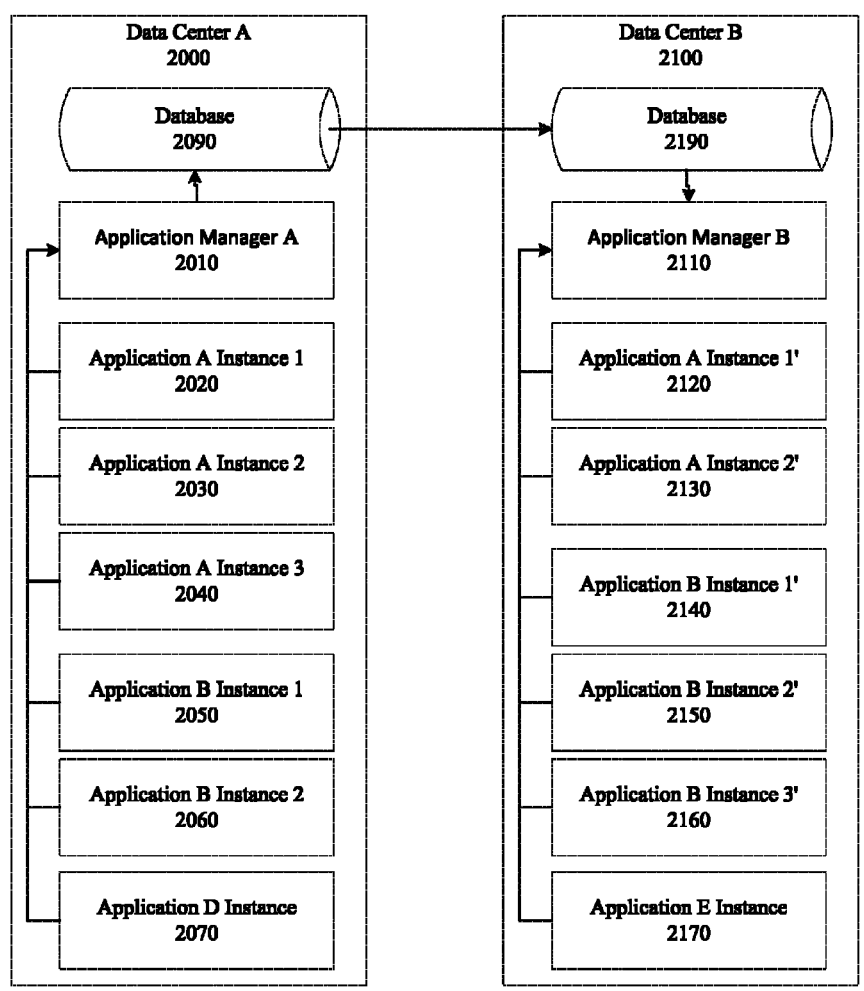
FIG. 2c depicts a variation of data centers sharing load information.

In the variation shown in FIG. 2c, Data Center A 2000 includes Application Manager A 2010 and Application A 2020, 2030, 2040, Application B 2050, 2060, and Application D 2070 as well as a database 2090. In the variation shown, Application A has three active instances 2020, 2030, 2040. Each application instance is associated with a particular level of resource usage and/or computational load. For example, if Application A is an e-commerce front end, an instance of Application A 2020 running on a particular application server (not shown) may be able to handle up to 100 simultaneous users and/or 500 requests at a time. In order to prevent or otherwise avoid application failure, a new instance of Application A may be activated or started on a different application server (not shown) within Data Center A 2000 when the previous instance(s) reach a certain capacity threshold or level of resource usage. In such a variation, Application A instance 1 2020 may be operating at 90% of capacity, Application A instance 2 2030 may be operating at 85% of capacity, and Application A instance 3 2040 may be operating at 30% of capacity. In some variations, a new application instance may be created based on a formula that sets a target maximum for CPU, memory, and, in some cases, QPS usage for the application. The number of instances available of the application in such a variation is therefore governed by the maximum total resource usage available to the application in the data center. Other variations may use different instance creation and instance management schemes, depending on factors such as the pricing scheme or service level associated with an application.

In the variation shown, Application Manager A 2010 may identify all instances of each application active in Data Center A 2000 and write information about the levels of system resource usage and/or computational load of each application instance to the database 2090 within Data Center A 2000. In some variations, such monitoring and database write operations may be performed by the Application Manager 2010 with a particular frequency. In some variations, the update frequency may be every 30 seconds. In other variations, update frequencies may be more or less often depending on factors such as system configuration, application makeup in Data Center A 2000, levels of resource usage across Data Center A 2000 or pre-set or otherwise known periods requiring more or less frequent application monitoring activity.

In some variations, the Application Manager 2010 may write a separate entry into the database 2090 for each application instance. In other variations, the Application Manager 2010 may aggregate overall usage and/or load data for the application instances and write an entry for each application into the database 2090. The database information from the database 2090 in Data Center A 2000 may then be propagated or otherwise replicated out to a database 2190 in Data Center B 2100.

Application Manager B 2110 in Data Center B 2100 may then read the replicated data from Data Center A 2000. Application Manager B 2110 may also write information about the applications and/or application instances 2120, 2130, 2140, 2150, 2160, 2170 active in Data Center B 2100 to the database 2190 in Data Center B 2100. The information from this database 2190 may then be replicated or otherwise propagated back to the database 2090 in Data Center A 2000, where Application Manager A 2010 may read load information about the applications and/or application instances in Data Center B.

The Application Manager 2110 reads the database 2190 and combines information read from the database with monitoring information about the resource usage and/or computational load of applications active in Data Center B 2100 to determine a shadow load, which is a predicted level of resource usage and/or computational load that may occur if one or more applications from one or more other data centers fail or the resource usage/computational load is otherwise moved to those versions of the applications running in Data Center B 2100. This shadow load may then be used to develop a data center resource allocation/re-allocation plan that can be implemented in the event those other data centers or Data Center Applications fail.

Figure 3:
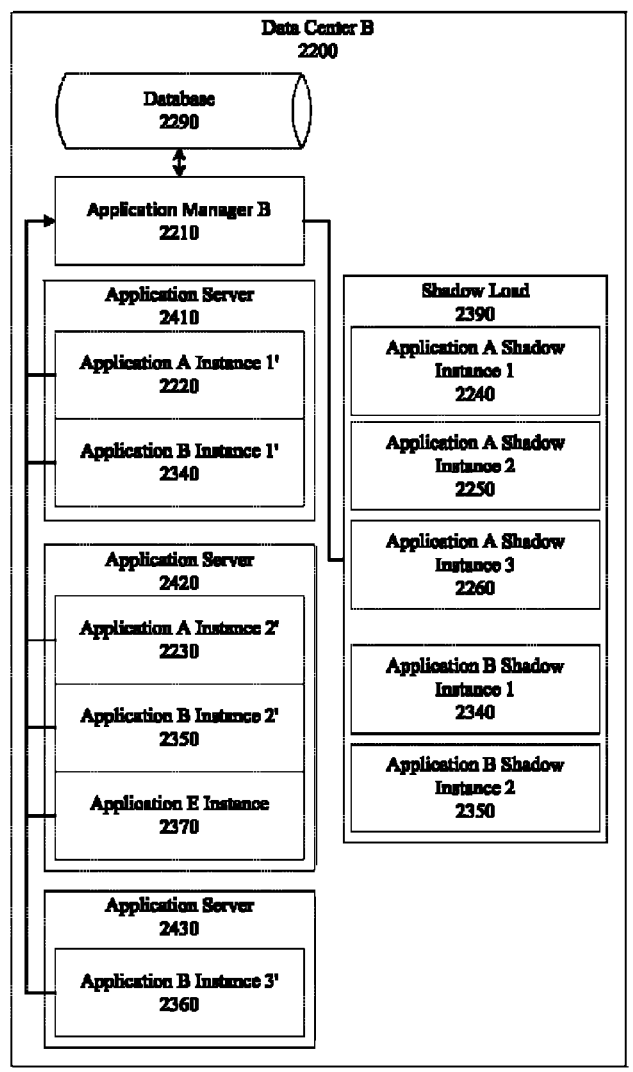
FIG. 3 depicts a variation of a data center with shadow load information.

An example of a data center with a shadow load is shown in FIG. 3. The shadow load may be included in a resource allocation plan managed or otherwise administered by the Application Manager 2210. The Application Manager 2210 may periodically evaluate each application and application server to determine how many instances each application may have and where the application instances are running. In some variations, the number of instances an application needs may be less than the number of instances currently running. In such situations, one or more application instances may be removed from one or more application servers, thereby releasing those application server resources to other applications. In some variations, the number of instances an application needs may be more than the number of instances currently running. In such situations, the application manager 2210 may allocate additional application servers or application server resources based on an indicated or predicted load for each application instance and/or application server.

In further variations, an Application Manager 2210 may periodically scan for imbalances in load between application servers and move applications or application instances around between application servers to address such load imbalances. In some variations, application and application server assignments may be stored in a local database where such information can be read by application front ends and application servers. In other variations, the application front ends and/or application servers may be notified of changes in application assignments through signaling or notification schemes outside of or other than the local database.

In some variations, applications operating in a data center may have multiple application instances. An application instance may be one particular process or set of processes executing or otherwise performing the application. FIG. 3 shows a variation of a data center having multiple application instances. <be clear tht is exemplary> In the variation shown in FIG. 3, an Application Manager 2210 operating within a Data Center 2200 manages and monitors a set of application-sand/or application instances active in the Data Center 2200. In the variation shown, Application A has two instances, Instance 1' 2220 operating on Application Server 2410 and Instance 2' 2230 operating on Application Server 2420. Application B has three instances, Instance 1' 2340 on Application Server 2410, Instance 2' 2350 on Application Server 2420, and Instance 3' 2360 on Application Server 2430. Application E has one Instance 2370 on Application Server 2420. The Application Manager 2210 monitors the applications, application servers, and application instances active in the data center 2290 and determines the resource usage and/or computational load for each application, application server and/or application instance within the data center 2200. In addition to writing this determined usage/load information to the database 2290, the Application Manager 2201 reads information from the database 2290 related to applications/application instances that indicate the data center 2200 as a preferred back-up or secondary data center.

Based on this read information, the Application Manager 2210 may calculate a shadow load 2390. The shadow load represents resource usage/computation load information about those applications/application instances from one or more other data centers that would have their load transferred to the data center 2200 in the event the other data center(s) or application(s) failed or otherwise became unavailable. A data center, application, or application sever may become unavailable for reasons including failure of physical hardware, shutdown or access restriction for system maintenance, data link failures making the data center, application or application server inaccessible, software failure impairing or preventing desired operation of the data center, application, or application server, or other issues that prevent or otherwise impair access to some or all of the physical and logical devices, data, and applications in the data center.

In some variations, the shadow load may be the aggregate load for each remote data center or application group from each data center. For example, if application X is using 10 CPU, 100 M of memory, and 100 QPS in data center Z, the shadow load for Data Center B 2200 would be 10 CPU, 100 M of memory, and 100 QPS for application X.

In another variation, application X could be running on data center Z, where it is using 10 CPU, 100 M of memory, and 100 QPS, and also on data center Y, where is it using 10 CPU, 100 M of memory, and 100 QPS. If the shard map shows an ordered data center list for application X as Z, Y, B, then the shadow load of application X for data center Y may be expressed as (Z, 10 cpu, 100M memory, 100 QPS). The shadow load of application X for data center B may be expressed as (Z, 10 cpu, 100M memory, 100 QPS), (Y, 10 cpu, 100M memory, 100 QPS).

In the variation shown, the shadow load 2390 includes three shadow instances of Application A 2240, 2250, 2260 and two shadow instances of Application B 2340, 2350. Each shadow instance (or, in some cases, shadow application) may include information about the resource usage/computing load associated with that instance. This information may be combined with the actual resource usage/computing load currently present in the data center 2200 as a result of the active applications/application instances therein to determine a predicted failover resource usage/computing load. This predicted usage/load level may then be used to generate or otherwise develop a resource allocation or re-allocation scheme to allow for smooth and relatively seamless transfer of application(s) or application computing load from a failed or failing data center/application.

The shadow load may be combined with the local load in various ways. In one variation, a predicted number of application instances for an application may be calculated by identifying a maximum resource usage area from among CPU, memory, and QPS usage areas based on a percentage usage level per area. For example, a number of instances for Application B based on CPU usage may be determined based on a sum of the local and shadow CPU usage divided by a target or available CPU resource pool in the data center 2200. Similarly, a number of instances for Application B based on QPS usage may be determined based on a sum of the local and shadow QPS usage divided by a target or available database query capacity in the data center 2200. The larger of such a calculated percentage may then indicate a number of instances of Application B that would be required in the event the remote data center(s) providing the shadow load information for Application B fail.

In other variations, a maximum of the number application instances indicated the local load vs. the shadow load may inform the application manager 2210 of an expected maximum number of application instances in required the event of remote data center failure. In yet other variations, the local load and shadow load CPU, memory, and/or QPS usage levels may be combined and used to infer or calculate a total number of application servers and/or application instances required at the local data center 2200 in the event of remote data center failure.

In some such variations, the calculated percentage or determined number of computing resources required may exceed 100% of resource capacity in the data center 2200. In such variations, the Application Manager 2210 may work to keep load balanced across application servers and data center resources to ensure that no application or application server is unfairly impacted. Other systems, however, may be responsible for adding computing capacity to the data center 2200 and/or redirecting traffic/load to other resources or data centers.

In some variations, the predictive failover usage/load may be calculated by the Application Manager 2210, which then provides this information to one or more resource allocation tools or utilities also operating in/on the data center 2200. The resource allocation tool(s) may then use this information to create or update a resource allocation plan. In other variations, the Application Manager 2210 may create or update a resource allocation plan. In such variations, the Application Manager 2210 may be doing resource scheduling, but it does not control traffic being directed to the data center 2200. One variation of resource allocation plan creation based on shadow load is shown in FIG. 4.

Figure 4:
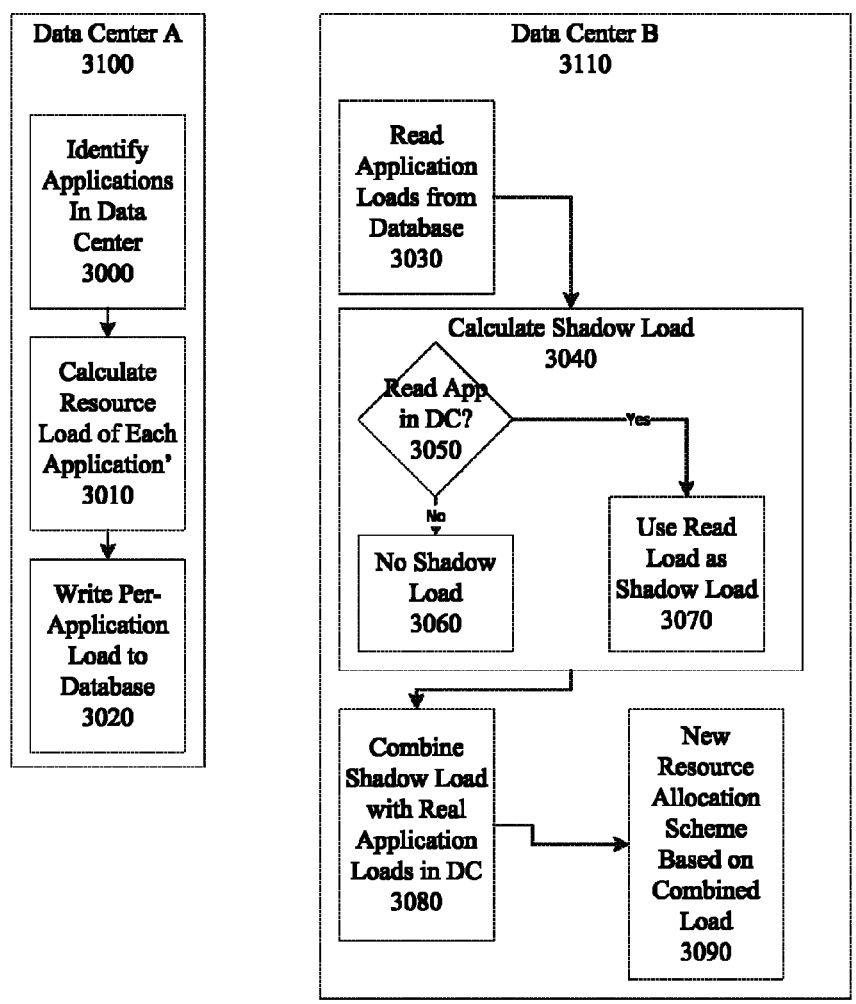
FIG. 4 depicts a variation of shadow load information creation and use processes.

As shown in FIG. 4, two operations are occurring concurrently on an ongoing basis as part of the shadow load calculation and resource allocation plan update processes. Although the two operations are depicted as occurring in different data centers, both operations should preferably occur in each data center included in a predictive failover management scheme of the type discussed herein.

The data write operation will be discussed in the context of Data Center A 3100 for exemplary purposes only. The Application Manager (not shown) operating in Data Center A 3100 identifies each application and/or application instance active in the data center 3000. A resource load of each application/instance may then be calculated 3010. In some variations, such a resource load may be calculated by examining each process associated with an application/instance and determining the CPU and memory usage of each such process. In other variations, such information may be acquired from the application servers running the applications/application instances. Such processor and memory usage information may be available through system or administrative tools included in an operating system or hardware management tool that is part of the data center 3100. Things measured may include total application server CPU, memory, and QPS and/or CPU, memory, and QPS for each application on the application server. Other performance data, such as network or disk bandwidth, may be recorded or measured as well. Such information may be acquired at regular intervals, such as every 1, 10, 30, 60, or 90 seconds. Other data collection intervals may be selected based on preferences or settings in the system or components thereof. In some variations, data collection intervals may vary based on calculated, predicted, or known usage levels or usage patterns, with load data being collected more frequently during levels of high application or system or data center usage.

In some variations, the application servers may be discrete physical devices residing in the data center. In other variations, one or more application servers may be virtual or logical allocations of computing resources (such as processors and/or processing power, and memory areas or portions of memory areas or capacity) defined by the applications or properties associated with that virtual or logical resource allocation.

After determining the resource load for each application/instance 3010, the per application/per instance load may be written to a database 3020. Variations of a database may include a database included in the data center 3100 or a database accessible by the Application Manager of the data center 3100. In concert with the database write operation 3020, the Application Manager in a data center 3110 may read the application loads 3030 written to the database (or replicated/propagated into the database) from other data centers.

The read application loads may then be used to calculate a shadow load 3040 which can be combined with the real application loads in the data center 3080 and used to create or update a resource allocation scheme to be used in the event of remote data center failure 3090. In one variation, the shadow load may be calculated 3040 by first determining whether the read application load information relates to an application or application instance that may fail over to the data center 3050. In some variations, read application data having no analogous application or application instance in the data center is not used to determine a shadow load 3060. In such variations, a failed application may have its load moved to another data center where an instance of that application is already active. Such variations allow for faster and more seamless failover, which is especially important when dealing with user-facing applications such as e-commerce or web-based games.

For read application data relating to an application that is configured or otherwise set to fail over to the data center 3050, the read application load for that application and/or set of application instances is used to determine the shadow load on the data center 3070. In some variations, the read application load may be directly used as the shadow load 3070. In other variations, the read application load data may be translated to account for differences in configuration and/or computing power between the source and destination data centers.

Figure 5:
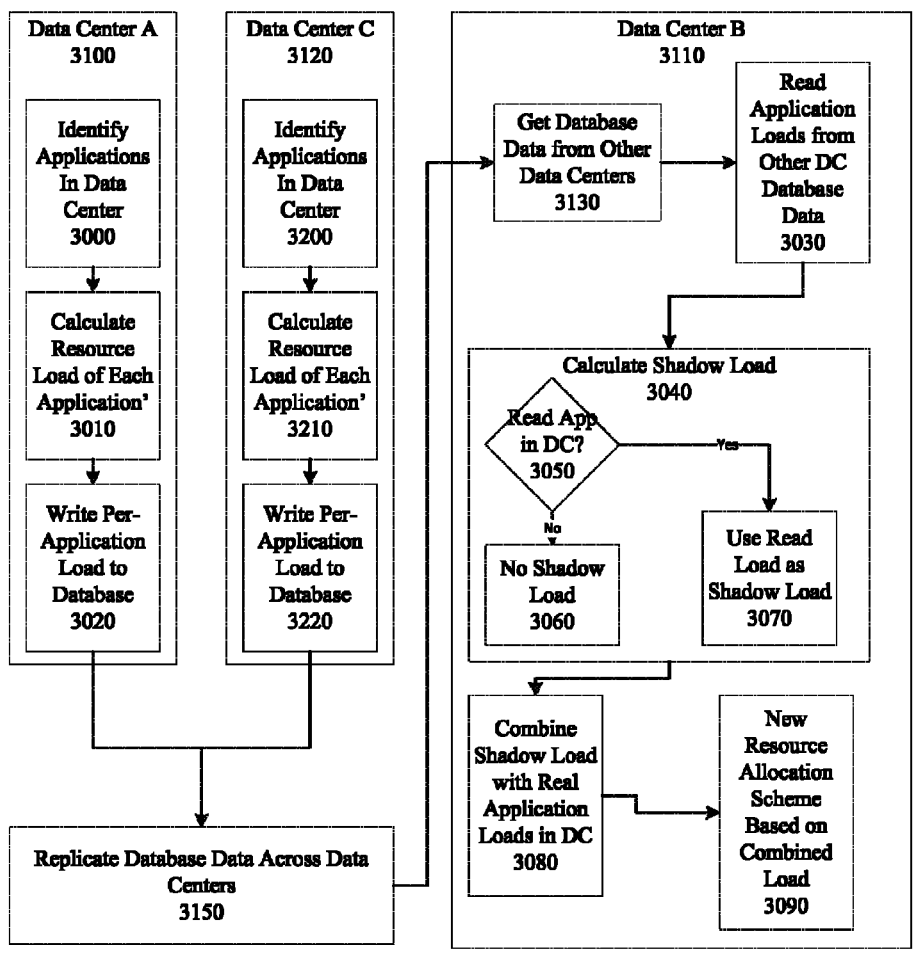
FIG. 5 depicts a variation of shadow load information creation and use processes.

Although discussed in the context of a source data center 3100 writing data and a destination data center 3110 reading data, the writing and reading operations are both ongoing in any data center included in such a predictive failover management scheme. Although discussed in the context of two data centers, variations of such a predictive failover management scheme are applicable in configurations involving three or more data centers. Such a variation is depicted in FIG. 5.

In the variation shown Application Managers (not shown) operating in Data Center A 3100 and Data Center C 3120 separately and independently identify each application and/or application instance active in their respective data center

3000, 3200. A resource load of each application/instance may then be calculated separately for Data Center A 3010 and Data Center C 3210.

After determining the resource load for each application/instance 3010, the per application/per instance/per application server/aggregate data center load may be written to a database 3020, 3220. Variations of a database may include a separate database included in each data center 3100, 3120 or a database accessible by the Application Manager of each data center. For variations having a separate database in each data center, the data written to the database 3020, 3220 may then be replicated across the databases in each data center 3150.

In some variations, such load information may be maintained in memory instead of in a database. Such variations are prone to data loss should an Application Manager restart or otherwise become unstable or compromised or otherwise unable to contact or communicate with application managers in other data centers. In some such variations, historical data may be used to predict changes in load for an application. Historical data may also be used in database-driven variations to improve resource requirement estimates and enable more effective predictive resource allocation planning.

The replicated database data may then be acquired 3130 and read 3030 by an Application Manager of a data center 3110. The read application loads may then be used to calculate a shadow load 3040 which can be combined with the real application loads in the data center 3080 and used to create or update a resource allocation scheme to be used in the event of application failover 3090. In one variation, the shadow load may be calculated 3040 by first determining whether the read application load information relates to an application or application instance active in the data center 3050. In some variations, read application data having no analogous application or application instance in the data center is not used to determine a shadow load 3060. In such variations, a failed application may have its load moved to another data center where an instance of that application is already active. Such variations allow for faster and more seamless failover.

For read application data having an analogous application or application instance active in the data center 3050, the read application load for that application and/or set of application instances is used to determine the shadow load on the data center 3070. In some variations, the read application load may be directly used as the shadow load 3070. In other variations, the read application load data may be translated to account for differences in configuration and/or computing power between the source and destination data centers.

In the case of multiple data centers, the application load information written to and read from the database may include information about a preferred failover data center. In such variations, read application data indicating the reading data center 3110 as a preferred failover destination may be evaluated or otherwise used for shadow load calculation 3040. In some variations, each data center may write to a particular table in the database dedicated for resource load update information from that data center. In some variations, an Application Manager may write data such that all other application managers in all other data centers participating in such a shadow load monitoring scheme can read what the Application Manager writes. This frees the Application manager of having to know which data center(s) are preferred failover destinations for which application(s).

In some variations, a failover destination data center may then be configured to know, in advance or via some other form of externally provided data or logic, which of the other data centers included in the predictive failover planning scheme can or will direct application loads to that destination data center. In other variations, each data center may write database records indicating a particular preferred failover destination. In some variations, such a preference indication may be made on a per-instance or per-application basis. Variations of database entries written to and read from a database as part of shadow load calculation are shown in FIGS. 6a-6c.

FIG. 6a shows a variation of a database table 6070 associated with a particular data center. All the entries 6060 in the table are originated from one particular data center. Each entry 6060 in the variation shown represents a particular instance 6010 of an application 6020 active in the Data Center At a particular time 6050. Each such entry 6060 may include data showing how many processors 6030 and how much memory space 6040 is being used by the application instance at that particular time 6050. In the variation shown, a data center ID or other identifier is not included, however other variations may also include information identifying the data center within the written data. In the variation shown, processor usage 6040 and memory usage 6040 are expressed in abstract units representing some predetermined amount of discrete function or capacity. In one variation, one (1) unit of processor usage 6030 may represent an amount of processing power associated with a particular type of processor, such as, for example, a 1.5 GHz Intel™ processor or a 1.33 GHz PowerPC™ processor. In other variations, one (1) unit of processor usage 6030 may represent some abstract or standardized measure of computing power, such as 5,000 MIPS (million instructions per second) or megacycles (millions of instructions executed).

Similarly, in some variations, one (1) unit of memory usage 6040 may represent an amount of memory capacity, such as, for example, one megabyte of memory capacity. In other variations, a unit of memory usage 6040 may represent an amount of memory capacity associated with a particular type of storage device, such as a 2 gigabyte non-volatile memory chip.

In the variation shown, each instance 6010 of an application 6020 active in the data center is recorded at a particular time 6050. In the variation shown, new entries 6060 are made in the table over time. Older entries 6080 may show fewer instances of an application and/or different processor and memory usage. In some variations, an Application Manager reading such a database table for a particular data center may identify the most recent timestamp 6050 in the table and read entries having that timestamp or a value within a certain range or threshold of that timestamp. In other variations, an Application manager may remember or otherwise have access to a last-read timestamp indicating the last time it read that particular table, and may read entries newer than this last-read timestamp. In yet other variations, data may simply be overwritten in the table, with new entries replacing old entries. In some such variations, the previous data in the table may be erased or otherwise cleared before new entries 6060 are made. In other variations, an Application Manager reading an over-written database table may find the most recent timestamp in the database and only read those records having the most recent timestamp.

Another variation of database entries showing application load is depicted in FIG. 6b. In the variation shown, each entry 6150, 6170 include data identifying the data center originating the load information 6100, an application identifier 6110, the number of instances of that application active/operating 6120, the number/amount of processors or processing power being used by the application within the data center or application server(s) 6130, an amount of process memory 6140 being consumed by the application, an amount of data-storage memory 6180 being consumed by the application, and a row indicator 6160.

Variations of identifiers for the data center 6100 and application 6110 are shown as alphanumeric, however other variations may use other types of data as identifiers. Some variations may employ pointers, raw binary values, or other types of data. In some variations, the application identifier 6110 may be standardized across data centers. In such variations, the application identifier may be used to identify the same application across multiple data centers. Some cloud computing or distributed computing environments may employ an application identification and classification scheme that assigns a unique identifier to an application for purposes such as tracking resource usage or enabling payment or commerce transactions related to an application. In such variations, that unique identifier may also be used as the application identifier 6110 for shadow load calculation purposes.

In the variation shown, a row identifier 6160 may be used in addition to or in place of a timestamp 6050. Such a row identifier 6160 may be a separate field in a database table record 6150 or may be an inherent feature of the database, such as a built-in index or row number used to track table size. The row identifier 6160 may be used by an Application Manager reading the table as a bookmark or placeholder feature instead of or in addition to a timestamp 6050. In one variation, an Application Manager may remember a last-read row number and read rows subsequent to that row number.

In the variation shown, each entry 6170 indicates a number of application instances 6120 and also provides indicators of total processor 6130, process memory 6140, and data memory 6180 associated with all the application instances. Other variations may provide an overall indicator of memory use 6040 without attempting to distinguish between memory used for process execution 6140 and memory used for data storage 6180. Yet other variations may provide per-instance indicators of processing power, processor memory, and data storage use. For those variations providing per-application data as an aggregate across all application instances active in the Data Center At the time of reporting/writing, the Application Manager may acquire information about the individual application instances and then consolidate that information prior to writing a database entry. Other variations may perform this such data aggregation within the database as either an intermediate/preliminary portion of the data writing process, or as part of a data presentation process whereby application data is aggregated into a view or report for reading by an Application Manager at a destination database.

Another variation of database entries showing application loads is depicted in FIG. 6c. In the variation shown, each entry 6250, 6270 in the database includes a data center identifier 6200, an application identifier 6210, and a preferred failover data center 6220 associated with the application. In such a variation, which may be used in situations involving three or more data centers, each application 6210 may have a different preferred failover data center 6220. In such a variation, a destination data center may only read those database entries indicating that Data Center As a preferred failover destination 6220.

In some variations, database reading may include a query to the database. Variations of such a query may include parameters limiting the returned data to be within a specific timestamp 6050 and/or row count 6160, relating to certain specific applications 6020, and, in some cases, directed to a specific data center 6220 and/or originated by a specific data center 6200. In some such variations, a single table may be used to accommodate data entries from multiple data centers 6270. In other variations, one or more tables may be associated with a particular Data Center And the Application Managers at destination data centers may be configured or otherwise directed to read from such particular tables based on the data centers for which they are failover destinations.

In variations where one or more particular tables are associated with a specific data center, an Application Manager in a failover destination data center may read all of the tables in the database if it does not know in advance the data centers or applications that have its data center listed as a failover destination. In some variations where one or more particular tables are associated with specific data centers, data overwrite may be preferred to an ongoing data log to help reduce a volume of data being generated and transmitted between the application managers.

Figure 7:
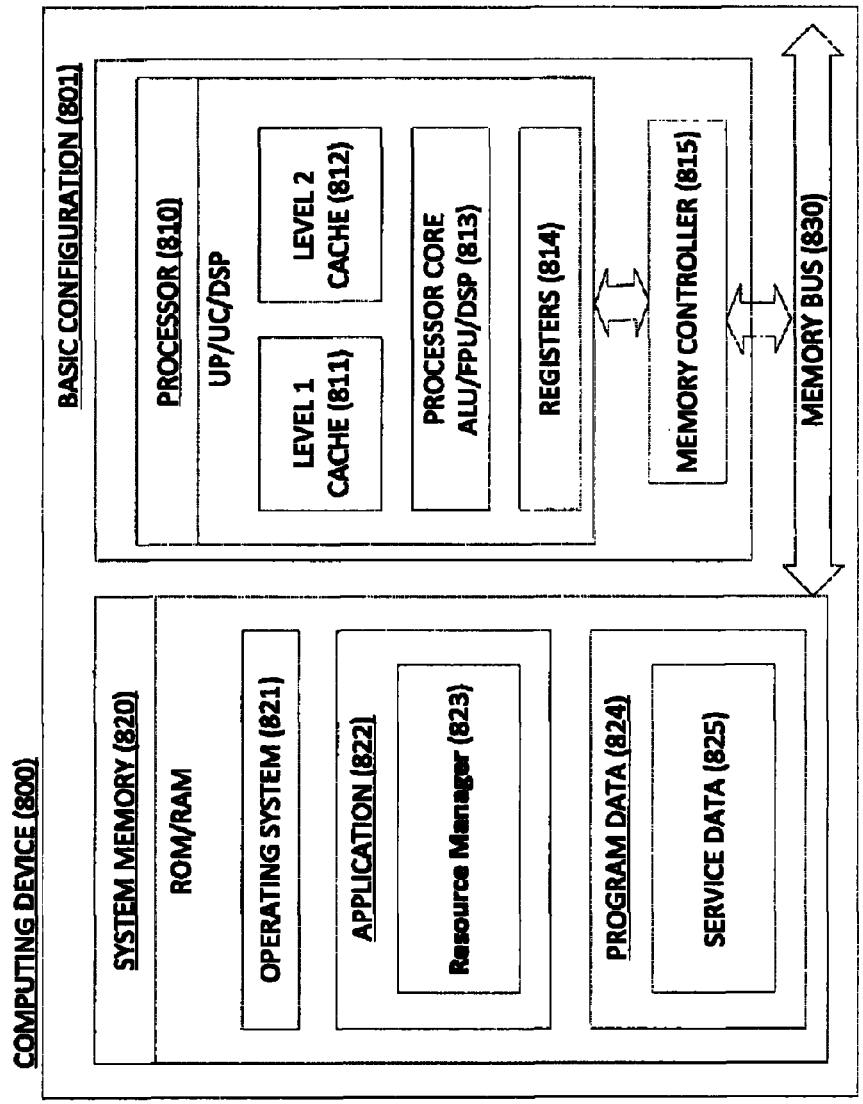
FIG. 7 depicts a variation of a processing module suitable for use in a data center.

As noted above, the processing elements of a data center may be embodied as part of, all of, or multiple computing devices. FIG. 7 is a block diagram illustrating an example computing device (800) that is arranged for data processing and/or executing applications and may be used for one or more of the processing modules (704). In a very basic configuration (801), the computing device (800) typically includes one or more processors (810) and system memory (820). A memory bus (830) can be used for communicating between the processor (810) and the system memory (820).

Depending on the desired configuration, the processor (810) can be of any type including but not limited to a microprocessor (µP), a microcontroller (µC), a digital signal processor (DSP), or any combination thereof. The processor (810) can include one more levels of caching, such as a level one cache (811) and a level two cache (812), a processor core (813), and registers (814). The processor core (813) can include an arithmetic logic unit (ALU), a floating point unit (FPU), a digital signal processing core (DSP Core), or any combination thereof. A memory controller (816) can also be used with the processor (810), or in some implementations the memory controller (815) can be an internal part of the processor (810).

Depending on the desired configuration, the system memory (820) can be of any type including but not limited to volatile memory (804) (such as RAM), non-volatile memory (803) (such as ROM, flash memory, etc.) or any combination thereof. System memory (820) typically includes an operating system (821), one or more applications (822), and program data (824). The application (822) may include an application that can perform resource management and allocation, such as evaluating resource usage within one or more computing devices (800) in a data center. Program Data (824) includes storing instructions that, when executed by the one or more processing devices, implement a set of processes that gather data about all other applications, application instances, and/or other resource usage and allocation ongoing within the data center (700) that includes the computing device (800). In some embodiments, the application (822) can be arranged to operate with program data (824) on an operating system (821).

The computing device (800) can have additional features or functionality, and additional interfaces to facilitate communications between the basic configuration (801) and any required devices and interfaces.

System memory (820) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of the device (800).

The computing device (800) can be implemented as a portion of a small-form factor portable (or mobile) electronic device such as a cell phone, a personal data assistant (PDA), a personal media player device, a wireless web-watch device, a personal headset device, an application-specific device, or a hybrid device that include any of the above functions. The computing device (800) can also be implemented as a personal computer including both laptop computer and non-laptop computer configurations. The computing device (800) can also be implemented as a module or rack element in a server or server array, or as a processing module (704) that is a virtual or logical construct representing a defined or otherwise measured portion of computing resources available within a data center. In such virtual machine variations, the computing device (800) may be an abstract representation of underlying hardware components having configurations similar to that of the computing device (800) but with different parameter or properties (such as more or fewer processors and/or memory, for example).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A system comprising
a first processor in a first data center; and
a first processor-readable memory having stored thereon instructions which, when executed, cause the first processor to perform the steps of:
first identifying a resource usage load of each of a first group of one or more applications active in the first data center; and
for each application in the first group, storing a result of the first identifying in a database with a first application manager operating in the first data center;
a second processor in a second data center; and
a second processor-readable memory having stored thereon instructions which, when executed, cause the second processor to perform the steps of:
second identifying a resource usage load of one or more applications active in the second data center;
reading a result of the first identifying from the database with a second application manager operating in the second data center;
determining, based on the read result, a second group of one or more applications in the first data center indicated to fail over to the second data center should the first data center fail;
for the second group of applications, computing a shadow resource load with the second application manager, the shadow resource load representing predicted computing resource requirements of the second group of applications in the second data center based on the stored result of the first identifying for each application in the second group; and
developing a failover resource allocation scheme based on the computed shadow resource load and a current local resource load of the second data center such that the second data center can automatically take on the resource usage load of the second group of applications if the first data center becomes unavailable, where developing the fail over resource allocation scheme includes, for each application in the second group of applications,
comparing a number of instances of an application in the current local resource load and a number of instances of that application in the shadow resource load; and
setting, as a required number of application instances in the event of failover, a largest of the compared numbers.

2. The system of claim 1, where the first identified resource usage load includes total CPU usage and total memory usage for each of the one or more applications active in the first data center.

3. The system of claim 1, the step of first identifying including:
gathering resource usage information from application servers in the first data center, where an application server provides resource usage information for an application running on that application server; and aggregating the gathered resource usage information for each of the one or more applications that is running on more than one application server in the data center.

4. The system of claim 3, the step of storing a result including writing the aggregated resource usage information to the database.

5. The system of claim 1, the system further comprising a second database that receives a replicated version of the stored result from the database to; and
where the step of reading a result includes reading the replicated stored result from the second database.

6. The system of claim 1, the step of second identifying including:
gathering resource usage information from application servers in the second data center, where an application server provides resource usage information for all application instances running on that application server; and
aggregating the gathered resource usage information for each application that is active in the data center by combining the gathered resource usage information about each instance of an application.

7. The system of claim 1, the first group being a sub-set of the applications active in the first data center.

8. A system comprising:
a processor in a data center; and
a processor-readable memory having stored thereon instructions which, when executed, cause the processor to perform the steps of:
identifying a local resource usage load of one or more applications active on application servers in the data center;
reading remote data center resource usage loads from a database, where the remote data center resource usage data includes resource usage loads for each of a first group of one or more applications active on application servers in remote data centers;
determining, from the read remote resource usage loads, a group of resource usage loads associated with a second group of one or more applications configured to fail over to the data center in the event a remote data center where one or more of those applications are currently running fails;
calculating a shadow load based on a result of the determining, where the shadow load represents an expected local resource usage load for the second group of one or more applications based on the read remote resource usage loads; and
developing a failover resource allocation scheme based on the shadow load and the local resource usage load, where the failover resource allocation scheme includes a resource allocation plan to be implemented in the event one or more resource usage loads from the second group of one or more applications are redirected to the data center, where developing the failover resource allocation scheme includes, for each application in the second group of applications,
comparing a number of instances of an application in the current local resource load and a number of instances of that application in the shadow resource load; and
setting, as a required number of application instances in the event of failover, a largest of the compared numbers.

9. The system of claim 8, the step of developing a failover resource allocation scheme including:
determining an expected percentage of CPU usage by adding an overall level of CPU usage from the local resource usage load and an overall level of CPU usage from the shadow load and dividing the added CPU usage by a total available CPU amount in the data center;
determining an expected percentage of memory usage by adding an overall level of memory usage from the local resource usage load and an overall level of CPU usage from the shadow load and dividing the added memory usage by a total available memory amount in the data center; and
using, as an expected overall usage level of data center resources, a larger of the determined percentage of CPU usage and the determined percentage of memory usage;
where a level of CPU usage is measured in discrete, predetermined units of data processing capacity.

10. The system of claim 8, the processor-readable memory having instructions stored thereon which, when executed, cause the processor to perform the step of storing a result of the identifying in a database.

11. The system of claim 10, where the step of identifying includes:
gathering resource usage information from application servers in the data center, where an application server provides resource usage information for an application running on that application server; and
aggregating the gathered resource usage information for each of the one or more applications that is running on more than one application server in the data center; and
where the step of storing includes storing the aggregated information.

12. The system of claim 8, the first group being a sub-set of the applications active in the remote data centers.

13. A non-transitory computer-readable medium having embodied thereon instructions which, when executed by a computer, cause the computer to perform the steps of:
identifying a local resource usage load of one or more applications active on application servers in the data center;
reading remote data center resource usage loads from a database, where the remote data center resource usage data includes resource usage loads for each of a first group of one or more applications active on application servers in remote data centers;
determining, from the read remote resource usage loads, a group of resource usage loads associated with a second group of one or more applications configured to fail over to the data center in the event a remote data center where one or more of those applications are currently running fails;
calculating a shadow load based on a result of the determining, where the shadow load represents an expected local resource usage load for the second group of one or more applications based on the read remote resource usage loads; and
developing a failover resource allocation scheme based on the shadow load and the local resource usage load, where the failover resource allocation scheme includes a resource allocation plan to be implemented in the event one or more resource usage loads from the second group of one or more applications are redirected to the data center, where developing the failover resource allocation scheme includes, for each application in the second group of applications,
comparing a number of instances of an application in the current local resource load and a number of instances of that application in the shadow resource load; and
setting, as a required number of application instances in the event of failover, a largest of the compared numbers.

14. The medium of claim 13, where the medium further includes instructions which, when executed by a computer, cause the computer to perform the step of storing a result of the identifying to a database.

15. The medium of claim 14, where the step of identifying includes:
gathering resource usage information from application servers in the data center, where an application server provides resource usage information for an application running on that application server; and
aggregating the gathered resource usage information for each of the one or more applications that is running on more than one application server in the data center; and
where the step of storing includes storing the aggregated information.

16. The medium of claim 13, the step of developing a failover resource allocation scheme including:
determining an expected percentage of CPU usage by adding an overall level of CPU usage from the local resource usage load and an overall level of CPU usage from the shadow load and dividing the added CPU usage by a total available CPU amount in the data center;
determining an expected percentage of memory usage by adding an overall level of memory usage from the local resource usage load and an overall level of CPU usage from the shadow load and dividing the added memory usage by a total available memory amount in the data center; and
using, as an expected overall usage level of data center resources, a larger of the determined percentage of CPU usage and the determined percentage of memory usage;
where a level of CPU usage is measured in discrete, predetermined units of data processing capacity.

17. The medium of claim 13, the first group being a sub-set of the applications active in the remote data centers.

* * * * *